(12) United States Patent
Morriss et al.

(10) Patent No.: US 8,589,306 B1
(45) Date of Patent: Nov. 19, 2013

(54) OPEN SOURCE LICENSE MANAGEMENT

(75) Inventors: William S. Morriss, Cincinnati, OH (US); Eleanor Maria Farrell Schalnat, Fairfield, OH (US)

(73) Assignee: Forst Brown Todd LLC, Cincinnati, OH (US)

( * ) Notice: Subject to any disclaimer, the term of this patent is extended or adjusted under 35 U.S.C. 154(b) by 0 days.

(21) Appl. No.: 13/301,193

(22) Filed: Nov. 21, 2011

(51) Int. Cl.
*G06Q 99/00* (2006.01)
(52) U.S. Cl.
USPC ............. 705/59; 705/1.1; 705/7.36; 705/7.37
(58) Field of Classification Search
USPC .................................. 705/1.1, 7.36, 7.37, 59
See application file for complete search history.

(56) References Cited

U.S. PATENT DOCUMENTS

| | | | | |
|---|---|---|---|---|
| 7,552,093 B2 * | 6/2009 | Levin et al. | ...................... | 705/59 |
| 7,552,429 B2 * | 6/2009 | Dettinger et al. | ............. | 717/162 |
| 7,568,109 B2 * | 7/2009 | Powell et al. | .................. | 713/187 |
| 7,870,075 B1 * | 1/2011 | Sabet | .............. | 705/52 |
| 8,086,869 B2 * | 12/2011 | Powell et al. | .................. | 713/187 |
| 8,359,655 B1 * | 1/2013 | Pham | .............................. | 726/26 |
| 2005/0125359 A1 * | 6/2005 | Levin et al. | ...................... | 705/59 |
| 2005/0216898 A1 * | 9/2005 | Powell et al. | .................. | 717/141 |
| 2006/0242077 A1 * | 10/2006 | Dettinger et al. | ............... | 705/59 |

OTHER PUBLICATIONS

Helmreich ("Best Practices of Adopting Open Source Software in Closed Source Software Products", Institut für Informatik. Professur für Open Source Software Friedrich-Alexander-Universität Erlangen—Nürnberg, Mar. 31, 2011, 103 pages).*
Experimental Use of the Open Source License Management U.S. Appl. No. 13/301,193, filed May 23, 2013.
Hwang, M., et al., "Representing Multivalued Attributes in Database Design", IACIS 2001, 7 pages.
Wedsite: Stack Overflow—multivalued attributes in databases, downloaded Sep. 7, 2011, from http://stackoverflow.com/questions/287794/multivalued-attributes-in-data . . . , 4 pages.
Website: CISI09—Database & File Management, Part Three, downloaded Sep. 7, 2011, from http://ww2.cis.temple.edu/cis109friedman/cis%20109%20-%20lecture% . . . , 63 pages.
Website: OpenLogic—Helping Enterprises Use Open Source Software, downloaded Jul. 17, 2012, from http://www.openlogic.com, 19 pages.
Website: FOSSology, downloaded Jul. 17, 2012, from http://www.fossology.org/projects/fossology, 10 pages.
Website: PALAMIDA—Application Security for Open Source Software, downloaded Jul. 17, 2012, from http://www.palamida.com, 8 pages.
Website: blackduck, downloaded Jul. 17, 2012, from http://www.blackducksoftware.com/, 7 pages.

* cited by examiner

*Primary Examiner* — James D Nigh
(74) *Attorney, Agent, or Firm* — Frost Brown Todd LLC

(57) ABSTRACT

A database driven tool can be used to enable front line engineering personnel to make requests regarding the use of open source software, to document those requests, and to provide responses to those requests to their originators. Information in addition to open source requests can also be maintained, including incoming licenses for a company's products, outgoing licenses for a company's products, and whether a particular product has been scanned to verify that all incoming licenses for that product have been identified.

5 Claims, 10 Drawing Sheets

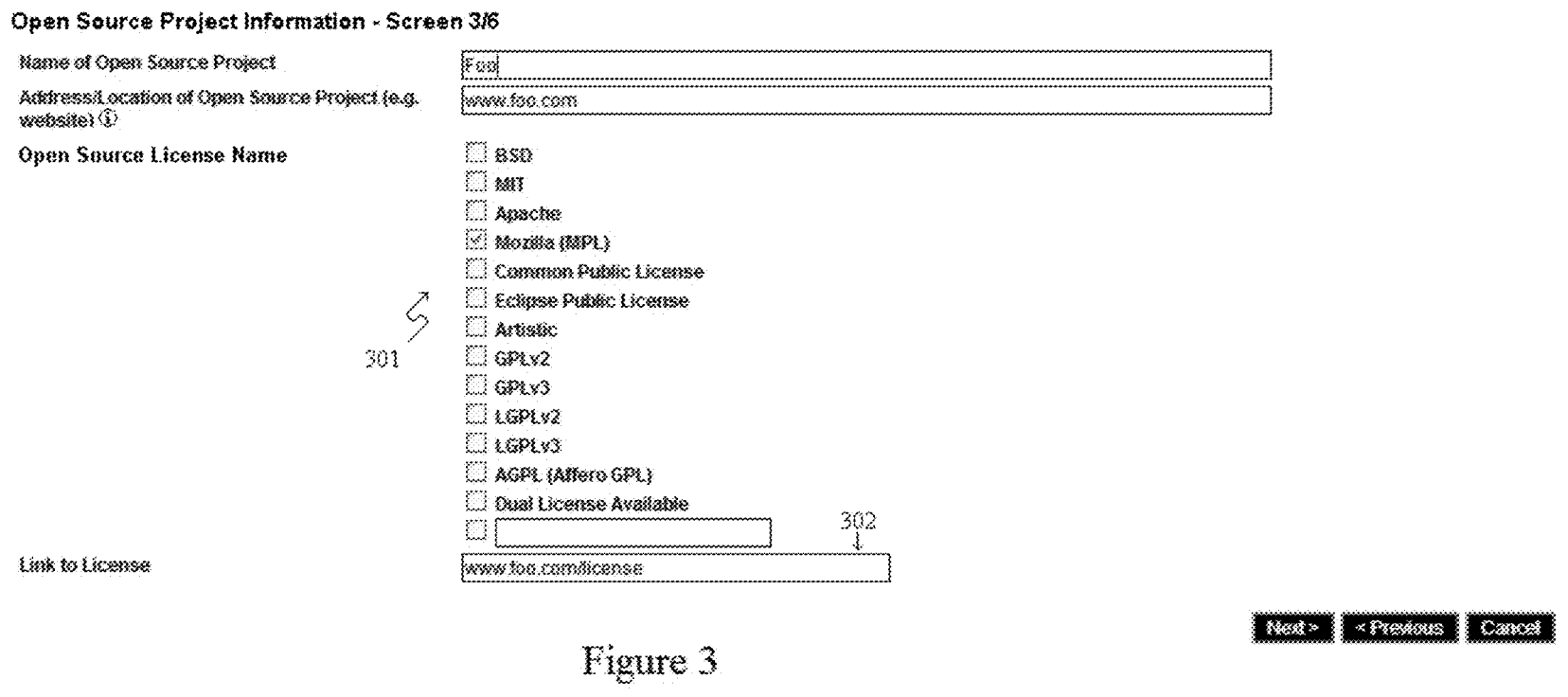

Open Source Project Information - Screen 3/6

Name of Open Source Project: [Foo]

Address/Location of Open Source Project (e.g. websites) ⓘ: [www.foo.com]

Open Source License Name:
- ☐ BSD
- ☐ MIT
- ☐ Apache
- ☒ Mozilla (MPL) — 301
- ☐ Common Public License
- ☐ Eclipse Public License
- ☐ Artistic
- ☐ GPLv2
- ☐ GPLv3
- ☐ LGPLv2
- ☐ LGPLv3
- ☐ AGPL (Affero GPL)
- ☐ Dual License Available Link to License: [www.foo.com/license] ← 302

[Next >] [< Previous] [Cancel]

Figure 3

Specific Use for Open Source Project - Screen 4/6

Proposed Use:

☐ Internal Tool (Note: Internal tools are used in development only (such as compilers, converters, debuggers, parsers). No part of the tool software will be incorporated into any product or utilized in an ASP environment.)
☐ ASP Use (Note: Use as part of an on-line service, including web pages or server-side Java applications.)
☐ Product Integration
☐ Standalone
☐ Aggregation
☐ Linking
☐ Exchange of Data
☐ Library

↶ 401

Select all that apply.
○ Yes ◉ No ←—— 402

Is comparable proprietary software currently available for the Open Source Project?

[ Next > ] [ < Previous ] [ Cancel ]

Figure 4a

Specific Use for Open Source Project - Screen 4/6

Proposed Use:

☐ Internal Tool (Note: Internal tools are used in development only (such as compilers, converters, debuggers, parsers). No part of the tool software will be incorporated into any product or utilized in an ASP environment.)
☐ ASP Use (Note: Use as part of an on-line service, including web pages or server-side Java applications.)
☐ Product Integration
☐ Standalone
☐ Aggregation
☐ Linking
☐ Exchange of Data
☐ Library

← 401

Select all that apply.

⦿ Yes ○ No ← 402

Is comparable proprietary software currently available for the Open Source Project?

Please list the software currently available.

403 →

[Next >] [< Previous] [Cancel]

Figure 4b

Open Source Context - Screen 6/6

Do you know anything about the Open Source Community Associated with this Project?

◉ Yes ○ No

Open Source Owner/Licensor Name

[ ]

Include copyright notice here, owner names, and/or any other information known about the management of this project.

Describe the Philosophy of the Open Source Project

[ ]

Describe the Community Associated with the Open Source Project (Check all that are known)

- ☐ Size of Community
- ☐ Experience of Community
- ☐ Philosophy of Community
- ☐ Frequency of Updates
- ☐ System for Changes (meritocracy, free-for-all, baton system)
- ☐ Is professional support available?
- ☐ Key Players?
- ☐ Project Maturity
- ☐ Project Sustainability
- ☐ Project Reliability/Performance
- ☐ Project Security
- ☐ Plan for Continuing Support (how will the Company deal with patches/upgrades)?

↙ 501

[Next >] [< Previous] [Cancel]

Figure 5

Product Information - Screen 2/6

Product Name  [Product A] ←701

Product Release/Version

Platform Product Run On

What other software (OSS or Proprietary), currently being used, is required for this product to work?

[                                                                                  ]
                                                                              702

What open source licenses are already integrated into this code base?

☐ BSD
☐ MIT
☐ Apache
☐ Mozilla (MPL)
☐ Common Public License
☐ Eclipse Public License
☐ Artistic
☐ GPLv2
☐ GPLv3
☐ LGPLv2
☐ LGPLv3
☐ AGPL (Affects GPL)
☐ Real License Has this code base been scrubbed before?  ⊙ Yes ○ No
                                                    ↖
                                                    703

When?  [          ]

[Next >] [< Previous] [Cancel]

Figure 7

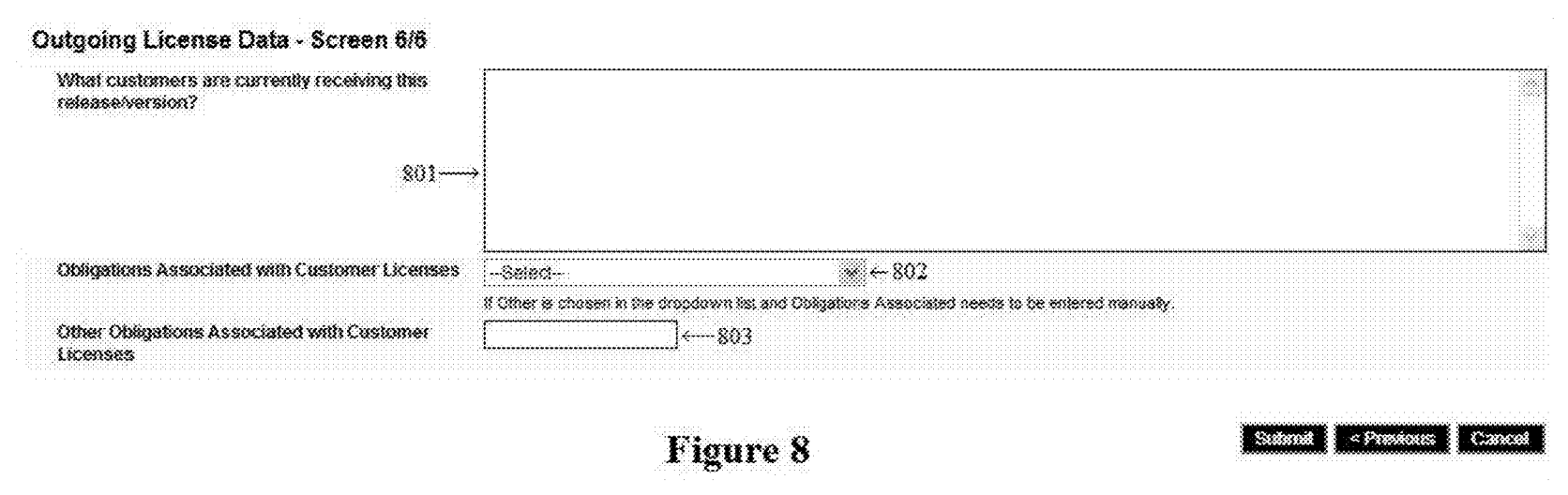

Outgoing License Data - Screen 6/6

What customers are currently receiving this release/version?

← 801

Obligations Associated with Customer Licenses

--Select-- ← 802

If Other is chosen in the dropdown list, and Obligations Associated needs to be entered manually.

Other Obligations Associated with Customer Licenses

← 803

[Submit] [<Previous] [Cancel]

Figure 8

OPEN SOURCE LICENSE MANAGEMENT

FIELD

Aspects of this disclosure can be implemented in the field of software license management, and particularly to the management of licenses for what is commonly referred to as "open source" software.

BACKGROUND

In general, the term "open source" is used to refer to software which is made available in both source code and object code forms, either without cost, or for only a nominal fee. This combination of low cost and source code accessibility makes open source software very attractive for programmers, because it provides them with the option of copying or adapting existing tools into their own code, rather than having to create code from scratch or rely on a vendor who will almost certainly neither provide source code nor allow modifications to be made to the software. Despite these benefits of open source software, there are many drawbacks to using it in a commercial setting. Chief among these is that some open source software is licensed under conditions that require any products which use the software to be distributed at no cost. Another drawback to open source software is that different open source software packages often have different licenses, and these licenses may or may not be compatible with each other and/or with the licenses for commercial software that a business might use.

As a result of the drawbacks described above, some businesses seek to address the risks of open source software by simply banning its use. However, this is an unsatisfactory solution because it sacrifices the ability to benefit from open source software in appropriate situations. An absolute prohibition on open source software can also suffer from non-compliance, as programmers may see open source software as a useful tool, which is being unnecessarily withheld from them by technically unsophisticated managers. Accordingly, there is a need for technology which can allow informed decisions to be made about the use of open source software, and which is convenient enough to be used by programmers in real time when deciding how to do their jobs. There is a further need for technology which can document the decisions made regarding the use of open source software, and provide a record showing what aspects of a business use (or do not use) open source.

SUMMARY

Aspects of the technology disclosed herein can be implemented in a variety of manners. For example, based on the disclosure set forth herein, one of ordinary skill could implement a method comprising: allowing a programmer, via a computer input device, to create a request to use open source software in creating code for a product; based on the request to use open source software in creating code for the product, storing a set of data in a memory; and providing the programmer, via a computer display device, a response to the request to use open source software. Similarly, the disclosure set forth herein could be used to implement a machine comprising a first computer configured to provide an interface specialized for creation of open source requests; and, a database communicatively coupled to the first computer and configured to store a set of data indicating information entered into the interface specialized for the creation of open source requests. Other methods, machines, and articles of manufacture could also be implemented based on this disclosure by those of ordinary skill in the art without undue experimentation, and so the preceding summary, as well as the descriptions and drawings set forth herein should be understood as being illustrative only, and not limiting.

BRIEF DESCRIPTION OF THE DRAWINGS

The drawings and detailed description which follow are intended to be merely illustrative and are not intended to limit the scope of the invention as contemplated by the inventors. In those drawings:

FIG. 3 illustrates an interface which could be used to enter open source license information.

FIGS. 4a and 4b illustrate interfaces which could be used to enter open source use information.

FIG. 5 illustrates an interface which can be used to enter open source context information.

FIG. 7 presents an illustrative incoming license interface.

FIG. 8 presents an illustrative outgoing license interface.

DETAILED DESCRIPTION

Certain aspects of the technology disclosed herein can be used to implement systems and methods for the management of open source software licenses, which can include both making decisions when and how to use those licenses, and documenting that decision making process. After reading this description, it will become apparent to one skilled in the art how to implement the disclosed technology in various alternative embodiments and alternative applications. Although various embodiments of the inventors' technology are described herein, it should be understood that these embodiments are presented by way of example only, and not limitation. As such, this detailed description should not be construed to limit the scope or breadth of the present invention as set forth in the appended claims.

Figure 1:
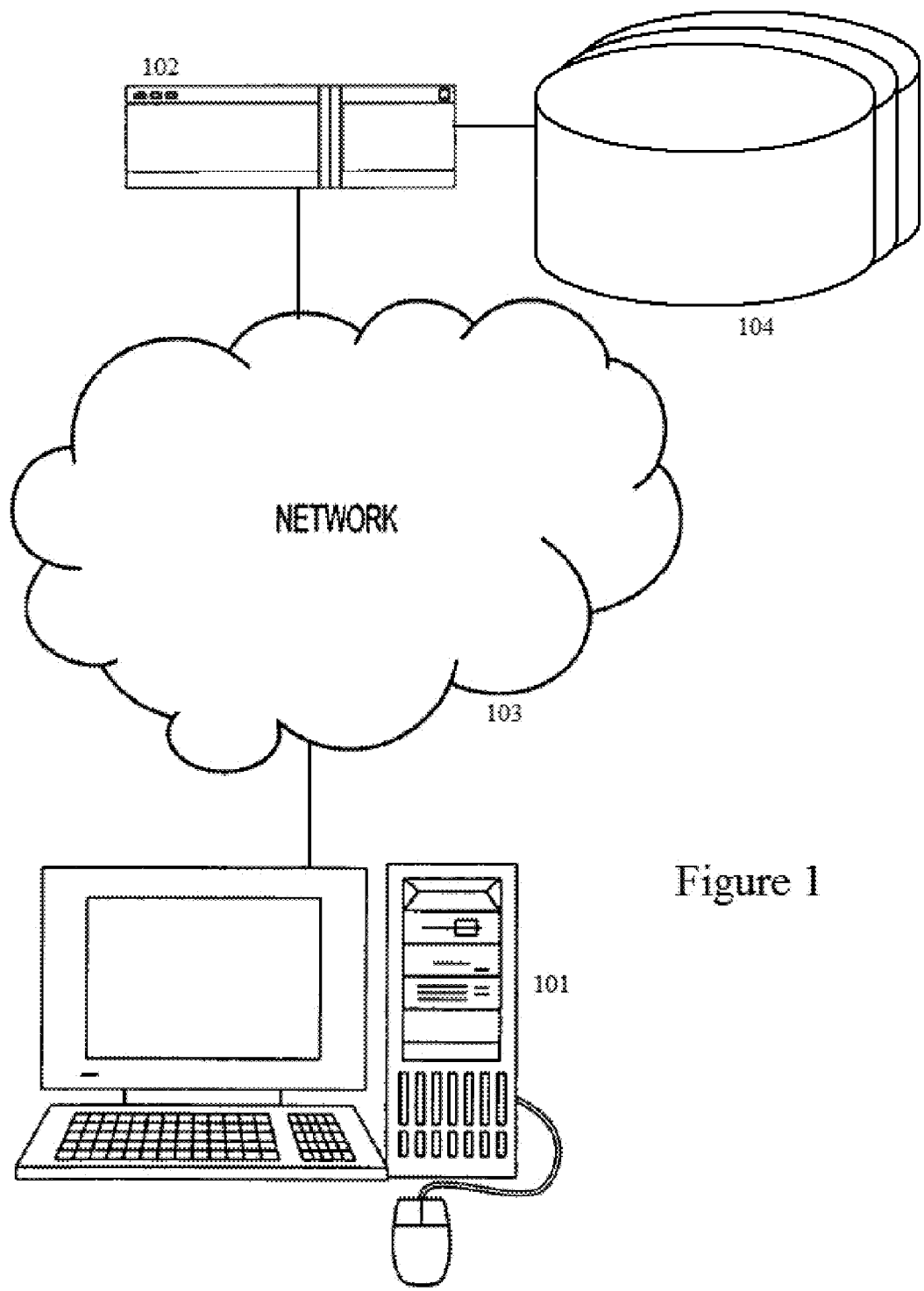
FIG. 1 illustrates an architecture which can be used for a tool implemented according to this disclosure.

Turning now to FIG. 1, that figure illustrates an architecture which can be used for a tool implemented according to this disclosure. In the architecture of FIG. 1, the primary point of interaction would be a user computer [101] which would connect to a server [102] over a network [103]. The server [102], in response to a request from the user computer [101] could provide the user computer with an interface. For example, the server [102] could be a web server connected to the user computer [101] over the Internet which is configured to send HTML, Javascript, and/or other code to be interpreted by a browser on the user computer [101] in response to a GET command. In such an implementation, the code which would be sent to the user computer [101] could be stored on the server [102], or one or more database(s) [104], or could be dynamically generated by the server [102] in response to a request from the user computer [101]. Once the code is received at the user computer [101], the user could then use the interface, provided by that computer [101], to view and/or modify data stored in the one or more databases [104] (e.g., using a form submit command). Other interfaces in addition to a browser based interface to a web server are also possible.

For example, the user computer [101] could be provided with a special purpose client application which would automatically interact with the server [102] using custom data transmission protocols, rather than relying on a browser which would interpret general purpose web design languages, such as HTML, Javascript or others. Similarly, it is possible that, rather than using an architecture with a remote server as shown in FIG. 1, in some implementations functionality such as described for the architecture of FIG. 1 could be provided locally on the user computer [101] itself. As a result, while the examples set forth herein focus primarily on implementations which utilize an architecture such as shown in FIG. 1, that focus should understood as being illustrative only, and should not be used to limit the protection accorded by this document or any document claiming the benefit of this document to any specific architecture, including the architecture depicted in FIG. 1.

Figure 2:
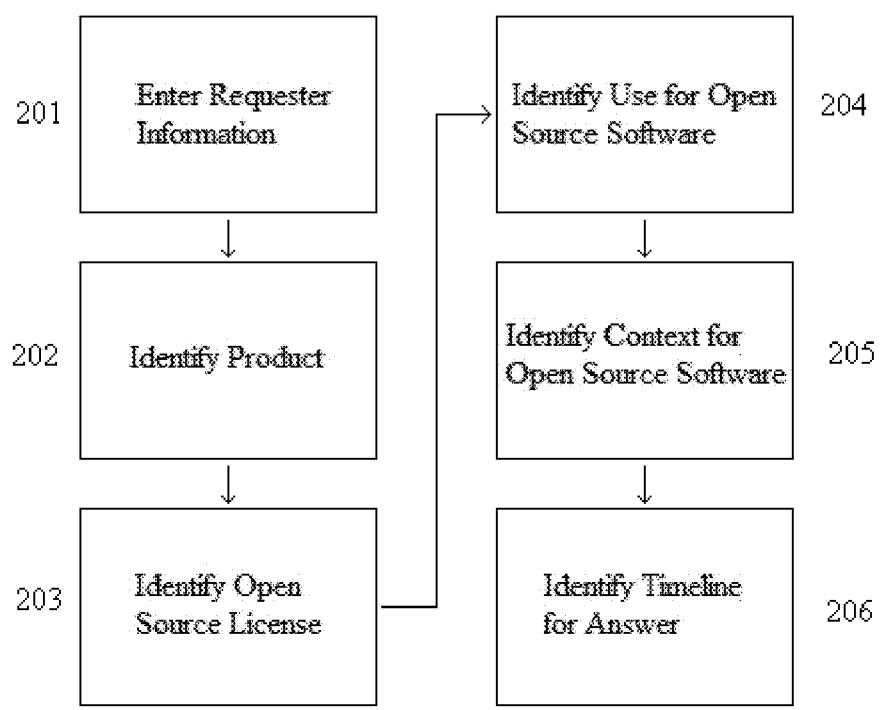
FIG. 2 illustrates a method which can be used in requesting permission to use open source software.

Turning now to FIG. 2, that figure illustrates a method which can be used in requesting permission to use open source software which could be performed using a tool such as discussed in the context of FIG. 1. Initially, in the method of FIG. 2, a user would enter information identifying himself or herself as requesting permission to use open source software [201]. For example, in a web based implementation, this step might take place by the user logging into a portal using a unique user name and/or password which he or she had previously selected or been assigned. Once the user had identified himself or herself [201], he or she would then identify the product that relates to the request to use the open source software [202]. To illustrate, consider the case of a programmer who has been assigned by his or her employer to create a new word processing program. If such a programmer wanted to use a feature from an existing open source product (e.g., Open Office) when creating the new word processor, then, in the second step [202], he or she would enter the name used by the company to identify the new word processor. This could be achieved using a variety of tools, such as text boxes where the user could enter a name, or drop down lists of products the company was working on (or which the user had been assigned to). Alternatively, in some cases, if a user had been assigned to a specific product, at the time the user identifies himself or herself as a requester [201], the tool could poll a remote database [104], discover the information, and automatically populate the product to which the user had been assigned.

In the third step [203], the user would enter the license which governs (or licenses which govern) the open source product. This step can be performed, for example, using an interface as shown in FIG. 3. In that interface, the user is provided with a license selection tool [301] (e.g., a set of check boxes, as in the illustrative interface of FIG. 3), which can be used to list popular/common licenses, thereby taking some strain of identifying a license off of the user. Such a license selection tool [301] could be implemented in a variety of manners, including drop down menus, radio buttons, text entry fields, or by using other similar constructs. It should be noted that, in the license selection tool [301] of FIG. 3, there is also a text entry field (and corresponding check box) which can be used if the specific open source product is controlled by a license other than one of those listed. Similarly, there is an option to indicate dual licensing (e.g., the software may be available under one license for free, and under a second license at some cost), allowing the user to meaningfully indicate multiple licenses using the selection tool [301].

The interface of FIG. 3 also includes a license link control [302], which can allow the user to provide a link to the license which governs (or links to the licenses which govern) the open source product. This can allow the tool to record the location where the license can be found, and/or to automatically download the license so as to maintain a record of what license was used for the open source product being considered. It can also be used to some extent as an error checking feature. For example, a check can be made that the document found at the linked location matches a reference copy of the appropriate license. Similarly, a check can be made that the location where the open source product is offered has the same top level domain as the location indicated for the license. Of course, it should be understood that such error checking may not be appropriate in all implementations, and that there might be implementations with more sophisticated error checking (e.g., analysis of links between the domain hosting a license and the domain hosting the open source product) or with no error checking at all (e.g., in a case where requests to use open source are stored for later review by a human). Accordingly, the discussion above should be understood as being illustrative only, and should not be treated as limiting.

After the user has identified the license for the open source software [203], he or she could move to the next step in the method of FIG. 2 and identify how the open source software would be used [204]. This could be achieved using an interface such as shown in FIG. 4a. In that interface, the user can be provided with a use selection tool [401], which indicates how the user wishes to use the open source software. As with the license selection tool [301] of FIG. 3, the use selection tool [401] could be implemented in a variety of manners, including drop down menus, radio buttons, text entry fields, or other similar constructs. Further, in addition to the use selection tool [401], the interface of FIG. 4 also includes a proprietary alternative indicator [402], which the user could use to indicate whether open source software is the only option for the particular task the user wants to complete. As shown in FIG. 4b, if the user indicates that open source is not the only option, he or she can be provided with an alternative option tool [403], which can be used to indicate exactly what the alternative options are. In the illustrative interface of FIG. 4b, the alternative option tool [403] is implemented as a text box. However, other implementations could also be used. For example, the alternative option tool could be implemented to present an interface similar to that illustrated in FIG. 3, which could allow the user to identify a web site for the alternative option, the vendor for the alternative option, the license and/or cost for the alternative option, and any notes the user may want to provide about the alternative option, such as the user's opinion of the alternative option relative to the desired open source software.

The user could also be given the chance to indicate multiple alternative options (e.g., using repeated presentations of a similar interface), if such was seen as desirable in a particular implementation. Further, in some instances, to facilitate indication of alternative options, the user could be provided with a drop down list of products and/or vendors (e.g., vendors which the user's employer had identified as approved vendors, or products for which the user's employer had already obtained a license) from which the alternative option could be chosen. Of course, not all implementations will include all, or the same, functionality as discussed above in the context of FIGS. 4a and 4b. For example, in some implementations, a user may be provided with an interface which allows him or her to identify the intended use for open source software, but which does not include functionality for indicating if there are alternative options. Accordingly, it should be understood that the discussion of FIGS. 4a and 4b above is intended to be illustrative only, and should not be treated as implying limitations on any claims based on, or claiming the benefit of, this disclosure.

After the user had identified the use for the open source software [204], he or she could move on to the next step of FIG. 2, and identify the context for the open source software [205]. This context could include information such as whether there is professional support available for the open source software, the maturity of the open source software, and the frequency of updates or patches for the open source software. These factors, as well as others which might be useful in considering whether to utilize the open source software, are illustrated in the context indication tool [501] of FIG. 5. Finally, the last step in the method of FIG. 2 is to identify a timeline for when an answer on whether the open source software can be used is needed [206]. This can be achieved in a variety of manners (e.g., using a calendar, clocks, sliders, etc) and the specific tools provided to allow a user to identify a timeline for when an answer is needed [206] will vary between implementations. Additionally, in some cases, it may not be necessary to identify a timeline for when an answer is needed [206]. For example, as discussed in more detail below, in some circumstances, a tool such as could be used in the method of FIG. 2 could be configured to immediately provide an answer for whether open source software can be used. In such a circumstance, providing a timeline for an answer might be limited to instances where the user wants to appeal the automated decision (assuming such an appeal is made available). It is also possible that there could be a mixed approach, where an answer could be automatically provided in some circumstances (e.g., for known and previously evaluated open source licenses) but where a timeline would be needed in others (e.g., for an unknown open source license). Other steps may also be skipped, may be skipped conditionally (e.g., depending on the use which would be made of the open source software). The sequence of steps is also variable, and may be modified by changing the order of steps, or combining the steps with one another. Accordingly, FIG. 2 and the associated discussion should be understood as being illustrative only, and not limiting.

As set forth above, in some implementations, in addition to (or as an alternative to) gathering information which can be used in deciding whether to authorize a particular use of open source software, it is possible that certain aspects of the decision making process could be automated. To illustrate the type of infrastructure which could be used to support this type of automated decision making, consider table 1 below, which could be used in automatically identifying conflicts between a business' commercial priorities and the requirements of particular open source licenses.

TABLE 1

Prohibited effects and intended uses for exemplary software applications

| Product Name | Prohibited Effects | Intended Uses |
|---|---|---|
| Application A | 001 011 101 | 011 |
| Application B | 100 000 | 001 |

In table 1, there are three columns: a column indicating the name of a product which could (potentially) be implemented using open source code; a column indicating effects of open source licenses which are prohibited for that product; and a column indicating how that product is intended to be used. Within those columns, the particular effects and intended uses are represented by binary numbers (shown as groups of three binary digits) where each non-zero digit in the numbers represents (depending on the column) either a prohibited effect or an intended use. Mappings between those non-zero digits, and the intended uses and prohibited effects, are provided below in tables 2 and 3.

TABLE 2

Mapping from uses to masks.

| Use | Mask |
|---|---|
| None | 000 |
| Internal Use | 001 |
| ASP Use | 010 |
| Conveying | 100 |

TABLE 3

Mapping from effects to masks.

| Effect | Mask |
|---|---|
| None | 000 |
| Must provide source code | 001 |
| Can't use as a technical protection mechanism under DMCA | 010 |
| Can't limit reproduction | 100 |
| Can't limit creation of derivative works | 001 000 |
| Can't limit distribution | 010 000 |
| Can't be used as basis for patent infringement claim | 100 000 |
| Can't rely on a patent license | 001 000 000 |
| Must make it work without non-open source code | 010 000 000 |
| Can't restrict reverse engineering | 100 000 000 |
| Can't restrict debugging | 001 000 000 000 |
| Covered by GPLv3 | 010 000 000 000 |
| Covered by LGPLv3 | 100 000 000 000 |
| Must provide source code or use dynamic linking to open source portion | 001 000 000 000 000 |
| Covered by Affero GPL v3 | 010 000 000 000 000 |

To illustrate how those mappings would work, the value given by table 1 for the intended uses for application A is 011. This means that application A is intended to be used both internally by the company (mask 001) and offered commercially using an ASP model (mask 010). Similarly, the value given by table 1 for the prohibited effects for application B is 100 000. This means that no actions should be taken which would have the effect of preventing application B from being used as the basis for a patent infringement claim. Other combinations of prohibited effects and intended uses could be represented using the same approach. Similarly, additional intended uses or prohibited effects could easily be accommodated by adding additional rows to tables such as tables 2 and 3, with each row representing an additional intended use or prohibited effect. The specific intended uses or prohibited effects used in an implementation will generally be determined by the plans of a particular business.

Of course, it should be understood that, while tables 1-3 illustrate how intended uses and prohibited effects could be encoded, the specific encoding approach indicated in tables 1-3 is intended to be illustrative only, and not limiting. As an example of an alternative approach, instead of assigning binary digits to the intended uses and prohibited effects, in some implementations, intended uses and prohibited effects could be represented by unique prime identifiers (e.g., the intended use of none could be 1, the intended use of internal use could be 2, the intended use of ASP use could be 3, and the intended use of conveying could be 5). In this approach, the prime numbers representing intended uses or prohibited effects could be multiplied together, thereby obtaining a single number indicating all intended uses or prohibited effects for a particular application (e.g., the number for the intended use column in table 1 for application A would be 6, representing the fact that application A is intended for both internal use (2) and ASP use (6)). It is also possible that, rather than having explicit tables mapping intended uses and prohibited effects to masks (or other types of identifiers, such as primes), in some implementations the conversion between information stored for a particular application and particular effects or uses might be made in code, rather than using information stored in tables. These types of approaches, as well as similar approaches (e.g., approaches where conversion is unnecessary, such as discussed below) which could be implemented based on this disclosure, are within the scope of the invention as contemplated by the inventors, and so the discussion of tables 1-3, and the alternative prime encoding technique should be understood as being illustrative only, and not limiting.

As a complement to tables 1-3 such as shown above, some implementations may also include information such as shown below in tables 4-5.

TABLE 4

Effects on new code based on its
interaction with software covered by a particular open source license.

| License | Aggregation | Basis | Linking |
|---|---|---|---|
| GPLv3 | 000 | 010 000 100 000 | 010 000 000 000 |
| Affero GPLv3 | 000 | 010 000 000 100 000 | 010 000 000 000 |
| LGPLv3 | 000 | 100 000 100 000 | 001 001 100 000 000 |

TABLE 5

Effects triggered for software
covered by a particular open source license based on use.

| License | Internal Tool | ASP Use | Conveying |
|---|---|---|---|
| GPLv3 | 010 | 010 | 001 111 111 |
| Affero GPLv3 | 010 | 111 111 | 001 111 111 |
| LGPLv3 | 000 | 000 | 011 111 101 |

Tables 4 and 5 use the same encoding scheme described above with respect to table 1, and show, respectively, the impact of new code based on how it is distributed with open source software covered by a particular license, and what effects are triggered for software covered by a particular open source license based on how that software is used. For example, in table 4, the value given in the linking column for the LGPLv3 is 001 001 100 000 000. In English, this means that, if new software is combined with open source software covered by the LGPLv3, or if the open source software covered by the LGPLv3 is linked to the new software, then the new software must be licensed under terms which do not restrict reverse engineering (100 000 000) or debugging (001 000 000 000), and the new software must be provided with the software covered by the LGPLv3 in source code form, or though dynamic linking (001 000 000 000 000). By contrast, table 4 indicates that if open source software covered by GPLv3 is used as the basis for new software, then the new software would be covered by the GPLv3 (010 000 000 000) and could not be used as the basis for a patent infringement claim (100 000). Turning to table 5, that table indicates that, for software covered by either the GPLv3 or the Affero GPLv3, it is not possible to use that software as a technical protection mechanism under the DMCA if the software is used for internal use, if it is used for ASP use, or if it is conveyed to customers. By contrast, software covered by the LGPLv3 can be used as a technical protection mechanism under the DMCA regardless of whether it is used for internal use, for ASP use, or conveyed. Of course, as with tables 2 and 3, tables 4-5 could easily be expanded to accommodate additional licenses, or additional types of uses and relationships, using the same type of approach discussed above with respect to tables 2 and 3.

Figure 6:
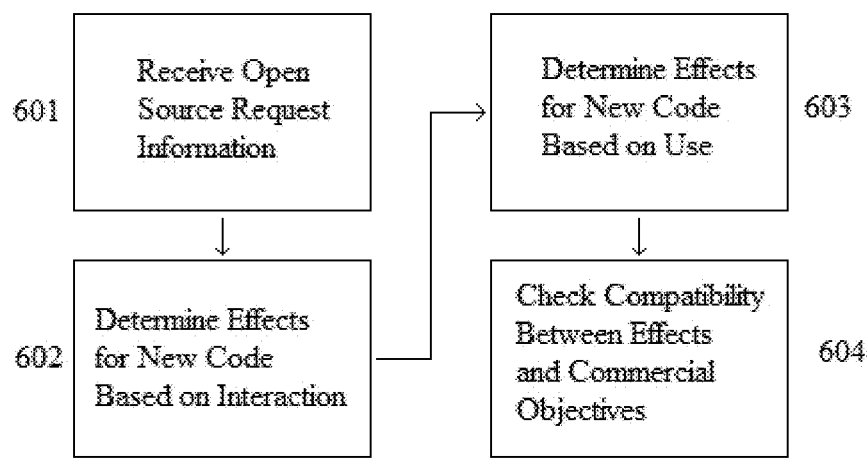
FIG. 6 illustrates steps which could be taken to automatically identify conflicts between use of a particular open source product and a business' commercial priorities.

Information such as shown in tables 1-5 could be used to automatically identify conflicts between a business' commercial priorities and request to use open source software using a process such as shown in FIG. 6. The first step in the process shown in FIG. 6 is receiving open source request information [601]. In this step, the individual who wished to use a particular piece of open source software could identify the open source software he or she wished to use, identify how he or she wished to use the open source software, and identify the project he or she wished to use the open source software on. To illustrate, assume that the individual was working on application A, and wanted to use a piece of open source software licensed under the GPLv3 as a basis for development. In this case, receiving the open source request information [601] would comprise receiving information that the requester was working on application A, that the requester had made a request to use open source software licensed under the GPLv3, and that the requester had requested to use the open source software as a basis for development.

After the open source request information has been received [601], the process of FIG. 6 continues to determine the effects the request would have on the new code if it were granted based on the type of interaction contemplated by the requester [602]. To illustrate, in the example from the previous paragraph, the type of interaction is using the open source code as a basis for development, and so the effect of granting the request on the new code for application A would be the value given for the GPLv3 in the basis column of table 4 (i.e., 010 000 100 000), and could, depending on the implementation, be retrieved in a single lookup. Programmatically, if the license governing the open source software from the request was represented by the variable Request.License, then the determination of effects based on interaction [602] could be completed using the statement SELECT Basis FROM InteractionTable WHERE InteractionTable.License= Request.License. Of course, other approaches (e.g., approaches using object databases, rather than relational database) are also possible, and will be apparent to those of ordinary skill in the art in light of this disclosure. Accordingly, the discussion above should be understood as being illustrative only, and not limiting.

Continuing with the process of FIG. 6, after the effects based on the interaction had been determined [602], the process would proceed with determining the effect of granting the request on the new code based on the intended use for the new code [603]. To illustrate, in the example given above, the new code, being developed, is part of application A. As shown in table 1, the intended use for application A is both internal use, and ASP use (represented by the union/logical or of 001 and 010). Also, as shown in table 5, the only effect of using code covered by the GPLv3 as an internal tool or for ASP use is that it can't be used as a technical protection mechanism under the DMCA. Thus, because one of the effects of using code licensed under the GPLv3 as a basis for designing new code is that the new code will also be covered under the GPLv3, the effect of granting the request based on the intended used for the new code [603] would be that application A could not be used as a technical protection mechanism under the DMCA. Programmatically, assuming the same type of database structure as discussed previously, and that the result of the determination of the effects based on interaction was stored as Interaction.effects, this determination could be made using statements set forth below in table 6:

TABLE 6

Statements which could be used to
determine effects of open source code based on use.

```
IF(Interaction.effects & 010 000 000 000) //check if an effect is that the new
                                          //code is covered by the GPLv3
{
    Temp.Uses = SELECT IntendedUses FROM ProductTable WHERE
                ProductTable.ProductName = Request.ProductName;
                //Store the intended uses for the product in a temporary
                //variable
    Use.effects = 0;
                //Set initial value for effects based on use. In alternative
                //implementations, such as prime number based
                //implementations, this initial value could be set to 1.
    IF(Temp.Uses & 001)//check if internal use is intended
    {
        Temp.InternalUse = SELECT InternalUse FROM UsesTable
                WHERE UsesTable.License =
                Request.License;
                //Store the effects caused by Internal Use in
                //a temporary variable.
        Use.effects = Use.effects | Temp.InternalUse;
                //Combine the effects of Internal Use with any
                //other effects which have already been
                //determined.
    }
    IF(Temp.Uses & 010)//check if API use is intended
    {
        Temp.APIUse = SELECT APIUse FROM UsesTable WHERE
                UsesTable.License = Request.License;
                //Store the effects caused by API Use in a
                //temporary variable.
        Use.effects = Use.effects | Temp.APIUse;
                //Combine the effects of API Use with any other
                //effects which have already been determined.
    }
    IF(Temp.Uses & 100)//check if Conveying is intended
    {
        Temp.Conveying = SELECT APIUse FROM UsesTable
                WHERE UsesTable.License =
                Request.License;
                //Store the effects caused by Conveying in
                //a temporary variable.
    Use.effects = Use.effects | Temp.Conveying;
                //Combine the effects of Conveying with any other
                //effects which have already been determined.
    }
}
```

Of course, it should be understood that the statements of table 6 are intended to be illustrative only, and that not all implementations will use the techniques set forth in table 6. One example of a variation on the approach taken in the table of FIG. 6 is to replace the mask values illustrated in that table with prime numbers, such as described previously. In such a case, rather than using the logical & operator, checks could be made if the numbers representing the variables being tested (e.g., Interaction.effects) had prime factors which corresponded to a given condition (e.g., if the effect of being covered by the GPLv3 corresponded to the prime identifier 31, then the statement Interaction.effects & 010 000 000 000 could be replaced by Interaction.effects % 31=0). Similarly, rather than using a logical | operator to combine effects, effects could be combined by multiplying the numbers representing the existing effects with the effects based on use (e.g., the statement Use.effects= Use.effects| Temp.Conveying could be replaced with Use.effects *=Temp.Conveying). Another example of a variation on the approach, taken in table 6, would be to replace the nested IF clauses with a loop (e.g., a WHILE loop) which would iterate through the uses, and combine the effects of those uses identified in the Temp.Uses variable. As another alternative, in some implementations, conditional statements might be eschewed all together. This could be achieved by, for each potential use, performing a logical & on each bit of a temporary use variable (e.g., Temp.InternalUse) with the appropriate bit from the Temp.Uses variable (or similar data, depending on the implementation), and then performing a logical | on the result of the logical & and the Use.effects variable. Further alternatives, such as not explicitly utilizing temporary variables (e.g., the results of database lookups could be directly operated on without being stored in temporary variables), are contemplated by the inventors, and will be immediately apparent to those of skill in the art in light of this disclosure. Accordingly, the discussion above should be understood as being illustrative only, and not limiting.

Finally, after the effects of granting the request to use open source software on the code being created have been determined, the process of FIG. 6 concludes by checking the compatibility of those effects and the commercial objectives for a business creating the new software [604]. To illustrate how this could take place, consider an implementation in which the effects granting a request to use open source software are stored in two temporary variables, Use.effects and Interaction.effects, and are represented as a string of binary digits which could be manipulated as shown in table 6. In such a case, checking for compatibility [604] could include a step of combining the temporary variables, for example, by using a statement such as Request.effects= Use.effects|Interaction.effects. Checking for compatibility [604] could also include a step of retrieving the prohibited effects data from a table such as table 1, for example, by using a statement such as Temp.ProhibitedEffects=SELECT ProhibitedEffects FROM ProductTable WHERE ProductTable.Product Name= Request.ProductName. Finally, checking for compatibility [604] could include a step of seeing if any of the effects in the combined temporary variables matched any of the prohibited effects. For example, this could be accomplished using a statement such as Forbidden=Request.effects & Temp.ProhibitedEffects ? TRUE:FALSE.

Note that, in the preceding example, whether there was an incompatibility (represented by the Forbidden variable) was determined without requiring identification of exactly which prohibited effect (or effects) would take place. Instead, because the there was at least one position which contained a non-zero value in both Request.effects and Temp.ProhibitedEffects, the value of Forbidden was set to TRUE. A similar effect could be achieved in a prime number based implementation by checking to see if numbers stored in Request.Effects and Temp.ProhibitedEffects had a greatest common factor which was greater than 1. If they did, then an incompatibility could be detected based on the existence of such a factor, without requiring a determination of exactly which effects corresponded to the prime identifiers that were factors of both Request.Effects and Temp.ProhibitedEffects. Of course, it is also possible that approaches in which the compatibility check [604] of FIG. 6 includes identification of particular effects of granting an open source request which are prohibited, or in which information from which the particular effects could be derived (e.g., the result of the operation Request.effects & Temp.ProhibitedEffects) would be stored (e.g., in a temporary variable). This could be useful in implementations which include functionality where, if an open source request is automatically declined, the requester is to be given some explanation for the decision. Other variations, such as where fewer steps are included in the compatibility check [604] (e.g., because values are not stored in temporary variables) are also possible, and will be immediately apparent to those of ordinary skill in the art in light of this disclosure.

While FIG. 6 and the associated discussion described how the disclosed technology could be used to automatically determine whether to approve or reject a request to use open source software, it should be understood that decisions whether to approve or reject requests to use open source software do not have to be made automatically. For example, it is possible that, rather than automatically approving or disapproving requests to use open source software, information related to a request (e.g., as discussed in the context of FIG. 2) could be stored in a database, and later provided to a human reviewer who was tasked with making the ultimate decision. Combined approaches are also possible. For example, in some cases, an automatic determination process could be used where there is a clear conflict between a business' commercial requirements and the effect of granting a request to use open source, but requests that could not be immediately rejected would be referred to a human for review. Similarly, in some implementations, the individual making the request to use open source software might be able to request human review, either as an alternative to an automated process, or as an appeal from an automated determination. In such an implementation, if a request to use open source software is denied, it is likely that the requester would be provided with some explanation for the denial, and that the reason for the denial (e.g., the specific prohibited effects detected by the automated system) would be stored (potentially along with the information provided with the user's original request) to be used in a later appeal. However, this is not a requirement, and, in some cases, a user might not be given the opportunity to appeal an automated decision, or even be informed that a decision is made in an automated manner at all.

While the above discussion focused on the process of making and documenting decisions regarding use of open source software, the technology conceived by the inventors can also be used for tasks which are not necessarily part of deciding whether to use open source software. For example, in some implementations, there might be functionality which facilitates tracking of licenses from external parties (referred to as "incoming licenses") which cover code used in a business's products. An illustrative interface which could be used to track incoming open source licenses is shown in FIG. 7. Such an interface could be provided to a user, who would preferably be a user who was tasked with entering product information, rather than a programmer who would request permission to use open source software, as part of a tool operating on an architecture such as shown in FIG. 1. As part of that interface, the user would be provided with a related software field [701], which could be used to identify other software which was necessary for a particular product to work, and an existing license selection tool [702], which could identify licenses covering open source code which had already been integrated into the product (if any). The interface of FIG. 7 also includes an audit status indicator tool [703], which could be used to indicate whether the code for the product for which information is being entered had even been screened (e.g., using an automatic code comparison tool) to identify all incoming licenses, and when such screening took place. Using an interface such as shown in FIG. 7, a user could provide baseline information regarding a product's open source licensing status, which information could then be stored (e.g., in a database [104], as shown in FIG. 1) for easy retrieval if it should be required in the future.

As a complement to, or as an alternative to, an incoming license data interface such as shown in FIG. 7, some implementations might also include an interface which could be used to enter data regarding licenses that had been granted allowing outside entities to use the software for which data is being entered (referred to as "outgoing licenses"). An example of such an outgoing license interface is provided in FIG. 8. In that interface, there is a customer identification field [801], a standard obligations tool and an additional obligations tool [803]. The customer identification field [801] can be used to identify customers using the software for which information is being entered (i.e., licensees for the outgoing licenses). The standard obligations tool [802] can then be used to identify common types of obligations which are placed on the business licensing the software by the licenses to the identified customers. For example, this tool can provide a drop down menu which is used to indicate that the business has agreed to indemnify its customers for costs of patent infringement suits based on open source software included in the licensed product, that the business has agreed to provide support for any open source software included in the licensed product, or that the business has provided a warrantee that there is no open source software included in the licensed product. Finally, the other obligations tool [803] can be used to indicate if there are any non-standard requirements in the licenses to the customers, such as requirements that may have been negotiated with particular individual entities. Once the information regarding outgoing licenses has been entered, it can be stored (like the information entered into an interface such as shown in FIG. 7) in a database [104] for easy retrieval if it should be required in the future.

Of course, it should be understood that, while FIGS. 7 and 8 provide examples of interfaces which could be used to enter incoming and outgoing license data, those interfaces are intended to be illustrative only, and one of ordinary skill in the art could easily implement variations on those interfaces based on the disclosure set forth herein. For example, in FIG. 7, the existing license selection tool [702] focuses on "open source" licenses. However, such a license selection tool [702] could easily be expanded to include proprietary licenses, such as licenses from vendors on a business' approved vendor list. Similarly, while FIG. 8 illustrates tools which could be used to provide common obligations for all customers listed in a customer identification field [801], in some implementations, there could be tools provided to allow specific obligations to be listed on a per customer basis (e.g., a pop-up asking if any of the customers have individual obligations, and allowing those obligations to be listed separately for each customer). Further, it is also possible that interfaces such as shown in FIGS. 7 and 8 could allow for non-software specific information to be added regarding the incoming and outgoing licenses. For example, FIGS. 7 and 8 could be modified to include tools to identify when incoming or outgoing licenses (or related obligations, such as support obligations) expire. This could be particularly useful for a business which would like to know what commitments it has to legacy customers or suppliers, as knowing when certain licenses expire would allow it to track what commitments are still active.

As an additional type of variation which could be implemented based on the disclosure above, consider how interfaces such as shown in FIGS. 7 and 8 could be integrated with technology for evaluating open source requests such as discussed in the context of FIG. 6. To illustrate, consider that, as discussed in the context of FIG. 6, it is possible to automatically detect conflicts between the terms of an open source license and a company's commercial priorities using appropriate tables and comparison commands. That same type of approach can be used to integrate information entered into interfaces such as shown in FIGS. 7 and 8 to identify conflicts between an open source request and obligations imposed by existing incoming and outgoing licenses. For example, in some implementations, there could be tables showing effects which are prohibited for a product by that product's incoming or outgoing licenses. These tables could be automatically populated based on information entered into interfaces such as those shown in FIGS. 7 and 8, and could then be used in the same way as the prohibited effects table of table 1.

Of course, variations with larger, or smaller, numbers of tables are also possible. For example, instead of having separate tables for effects prohibited by incoming and outgoing licenses, there could simply be a single prohibited effects table, and prohibited effects could be added (e.g., by using a logical |, as discussed previously) to that table as new information is added to incoming and outgoing license interfaces. Alternatively, rather than having tables which collectively represent incoming and outgoing licenses, it is possible that individual licenses could be represented by their own tables. To support this, a tool operating in an architecture such as shown in FIG. 1 could be configured to allow users to enter information for individual incoming and outgoing licenses, and to automatically create tables for those individual licenses after the user enters the appropriate information. This could be particularly useful in cases, such as described previously, where information is stored to track when particular licenses or obligations expire, as this expiration information could be used to determine when the restrictions in a particular table are no longer operative.

Variations in which information entered during a process such as shown in FIG. 2 is added to license information such as could be entered in interfaces such as shown in FIGS. 7 and 8 are also possible. For example, as described with reference to FIG. 6, some requests to use open source software, if granted, have the result of imposing certain license terms on the new software where the open source software is used. In some implementations, those new license terms could be treated in the same way as incoming license terms added through an interface as shown in FIG. 7, and could automatically be propagated to the appropriate tables to ensure that they are considered when future requests to use open source for a particular project are made. Accordingly, the discussion above of the interfaces of FIGS. 7 and 8, and how information entered into such interfaces can be utilized, should be understood as being illustrative only, and not limiting.

Figure 9:
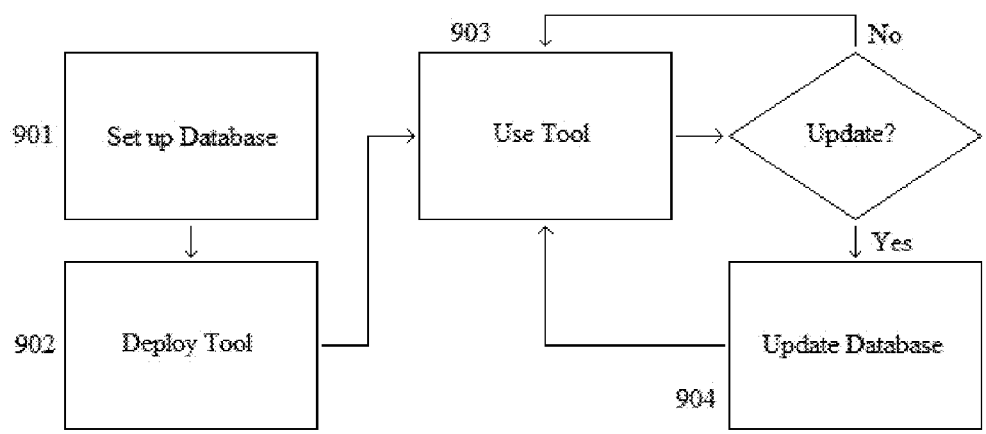
FIG. 9 depicts a flowchart for a method in which a database driven tool is deployed, used and updated.

Turning now to FIG. 9, that figure depicts a method by which a database driven tool, such as could be implemented based on the disclosure set forth herein, can be deployed, used and updated. In that method, the first step is setting up a database [901] which could be used to drive operation of the tool in subsequent steps. While this setup could take place in a variety of ways, in a preferred method, it will be set up by a consultant employed by an entity which, in the ordinary course of its business, monitors open source licenses, evaluates their terms, and helps other companies make appropriate use of open source software. Such a consultant could use a master database of effects which have previously been identified by his or her employer, and ask the company for whom the database is being set up which of those effects are particularly relevant to the company's business. The consultant could also identify additional effects which are relevant to the company's business but which are not present in the master database. For example, the consultant could review the company's incoming and outgoing licenses and identify if any of those licenses have (or prohibit) effects which are not included in the master database.

After the additional effects had been identified, they could be added to the master database (e.g., by adding them to an effects table such as illustrated by table 3), and the company for whom the database is being set up could be provided with access to the master database. For example, the company could be provided with a copy of the database which it would store on its own systems, or could be provided with login information that could be used to access a copy of the database maintained by the consultant's employer. The company could also be provided with information indicating which of the effects in the database were identified as being relevant by the consultant. As set forth below, this information could later be used to automatically generate interfaces which could be used in the deployment and operation of the database driven tool.

Continuing with the discussion of FIG. 9, once the setup of the database [901] is complete, the process of FIG. 9 can move forward to the deployment of a tool [902] which would be driven by that database. As with the setup of the database [901], the deployment of the tool [902] can be performed in a variety of manners. However, a preferred method of performing this step is to start by generating a set of integration interfaces using the information from the database setup [901]. This type of automatic generation could take place, for example, by generating an outgoing license data interface such as shown in FIG. 8, populating the standard obligations tool [802] with effects which had been identified as relevant by the consultant, and populating the additional obligations tool [803] with effects which were stored in the database but which were not identified as relevant during database setup [901].

Once the appropriate interfaces are available, in the preferred method, deployment of the tool [902] would continue with those interfaces being used to create any database tables which had not been created during the database setup [901]. For example, incoming and outgoing license interfaces such as shown in FIGS. 7 and 8 could be used to input data regarding the current state of the products of the company using the tool. Additionally, the products themselves could be registered, and their business requirements could be added to the database used by the company. This could take place, for example, by providing business personnel with access to interfaces such as shown in FIGS. 7 and 8, except the interfaces provided to the business personnel could be used to indicate what effects were prohibited for a particular product as a matter of commercial policy, rather than indicating what obligations were applied to a particular product based on the associated incoming and outgoing licenses. Of course, it should be understood that these steps are intended to be illustrative only, and that not all methods implemented to follow the sequence shown in FIG. 9 will include those steps as part of deployment of the tool [902]. For example, in some implementations, all of the database tables would be populated during the database setup [901], perhaps by the consultant as part of identifying relevant effects. Accordingly, the above discussion of how a database driven tool could be deployed should not be used as a basis for incorporating limitations into any claim included in this document, or any related document.

Another type of activity which can take place during deployment of the tool [902] is to register individual users who will have access to various aspects of the tool after deployment is complete. For example, as described above, in some cases, individual users of a tool could be associated with different products that they were assigned to as part of their job responsibilities. To support this, in some implementations, deployment of the tool [902] could include creating one or more tables in a database used by the company associating users with products for which open source requests could be made. Such tables could be created in a variety of manners, such as using interfaces which allow the individual (or individuals) setting up the tool to connect users with products, or by importing existing information (assuming such information exists), such as from a human resources or engineering database. Once users who will be using the tool have been registered into the system, the business for which the tool will be used can take advantage of the introduction of the tool as an opportunity to instruct the users in the relevance of open source software to the company's commercial objectives, and to help foster a culture of awareness of, and compliance with, the company's open source policies. For example, in a case where engineers have the general belief that open source software is free and unrestricted as long as whoever is using it gives credit to the original programmers, the discussion of different types of open source licenses can be used to provide real world examples of how open source can require much more than simply giving credit. Of course, such training could be provided by the business which employs the individuals who will be ultimately making open source requests, by an outside consultant, or by some combination. Additionally, it should be understood that taking advantage of the opportunities for educating users of a tool is not required in all implementations of a method such as illustrated in FIG. 9, though it is preferred that that method be implemented in such a way as to educate users in why the tool is necessary, rather than simply training them on how it can be used.

Moving on with the discussion of FIG. 9, after the tool is deployed [902], it can be used in the operation of the business [903]. Such operation can, of course, include making, documenting and responding to open source requests and/or documenting licensing decisions. However, other uses for a tool such as could be implemented using the approach of FIG. 9 are also possible. For example, consider a case where a business wishes to take a program originally developed for their internal use only, and commercialize it by selling it to the public. In such a case, a tool such as described could be used to check whether the proposed new use for the program is consistent with the requirements imposed by the software used in the program's creation, such as by setting up the commercial requirements for the hypothetical new product using interfaces as disclosed herein, then comparing those requirements with the restrictions stored in the database for the program in its current form. The results of this comparison could then be stored by the tool, thereby creating a record of what was considered in making the decision whether to go forward with the proposed commercialization of the program. Additionally, if the decision to adopt the new use for the product was made, a new record could be created corresponding to the new use, which record could be treated as discussed above in determining whether subsequent open source requests should be granted. The existing record could then be retired or, if appropriate (e.g., if the existing product is being forked into internal and external versions) maintained in the database as well. Similarly, a tool such as disclosed herein could be used to make and/or document other similar decisions, and so the disclosure of the particular uses of the tool set forth herein should be understood as being illustrative only, and not limiting.

Finally, as shown in FIG. 9, in some cases, it is possible that a database such as described could be updated [904] to ensure that the business or businesses using the database would always have the most current information available. As an example of how this updating [904] might work, consider a case of a company which had initially identified a particular type of effect to be irrelevant, but, because of changes in its commercial priorities, later decided that that effect was relevant after all. In some implementations, such a case could be accommodated by allowing the business to flip the relevance status of an effect, and then regenerate the interfaces to the tool based on the modified status. Other types of updates are also possible. For instance, consider the case of a company which encounters an open source request dealing with a license which is not included in the company's database. In such a case, a preferred embodiment would allow the company to submit that open source license to some central location (e.g., the entity which provided the open source database originally, assuming that it was provided by an outside entity) where the new license would be subjected to analysis and new database tables for that license would be created. Those database tables could then be provided to the company which submitted the unfamiliar license as an update to that company's database. Additionally, it is also possible that, on a periodic basis (e.g., monthly) a company at which a database had been deployed could contact the central location to find out if its database was up to date, and, if the database was not (e.g., because information for a new open source license had been added to the master database), could be sent an update to the database.

These updates could be connected to various types of business models, such as only providing updates to businesses which had paid a subscription fee, providing updates to businesses which had paid a subscription fee or submitted an unfamiliar open source license, charging per update and sharing revenue with companies that submit unfamiliar open source licenses, or combinations of the above. Non-commercial approaches are also possible. For example, it is possible that updates could be provided by an entity which also provides open source software contributed by members of the public. In such a case, the entity providing the open source software could generate updates by requiring anyone who contributes software to either license it using a license already in that entity's database, or to create the appropriate tables for any new licenses at the time he or she makes a contribution covered by such new license. Of course, it should be understood that these commercial and non-commercial methods of structuring updating are intended to be illustrative only, and should not be treated as limiting on the protection accorded by this, or any related, document.

While the above disclosure was focused on application of the inventors' technology in the context of open source licensing, it should be understood that the disclosed technology is not limited to being applied in that context, and the inventor's technology, or aspects thereof, could be used in other contexts as well. For example, while the above disclosure addressed the use of multi-valued attributes in the context of a database (such as a relational database) used for open source license management, the described techniques for the use and storage of multi-valued attributes could be applied in other contexts without requiring undue experimentation based on their disclosure herein. Accordingly, instead of limiting the protection accorded by this document, or by any document which is related to this document, to the material explicitly disclosed herein, the protection should be understood to be defined by the claims presented in this or any related document, when the terms which are listed below under the label "Explicit Definitions" are given the explicit definitions set forth therein, and the remaining terms are given their broadest reasonable interpretation as shown by a general purpose dictionary. To the extent that the interpretation which would be given to any claims based on the above disclosure is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

EXPLICIT DEFINITIONS

When used in the claims, "based on" should be understood to mean that something is determined at least in part by the thing that it is indicated as being "based on." When something is completely determined by a thing, it will be described as being "based EXCLUSIVELY on" the thing.

When used in the claims, "computer readable medium" should be understood to mean any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space.

When used in the claims in the context of configuring a computer, "configure" should be understood to mean providing a computer with specific data (which may include instructions) which can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

When used in the claims, "data" should be understood to mean information which is represented in a form which is capable of being processed, stored and/or transmitted.

When used in the claims, "database" should be understood to mean a collection of data stored on a computer readable medium in a manner such that the data can be retrieved by a computer. The term "database" can also be used to refer to the computer readable medium itself (e.g., a physical object which stores the data).

When used in the claims, "determine" should be understood to mean the act of generating, selecting or otherwise specifying something. For example, to obtain an output as the result of analysis would be an example of "determining" that output. As a second example, to choose a response from a list of possible responses would be a method of "determining" a response.

When used in the claims, "interface" should be understood to refer to a set of controls or interaction points which allow communication of information. A variety of "interfaces" are possible, including interfaces comprising multiple screens (e.g., a web site interface were information is entered in multiple pages) and interfaces comprising single screens (e.g., a web page interface). Non-visual interfaces, such as audio interfaces and haptic interfaces should also be understood as falling within the general category of "interface."

When used in the claims, "open source software" should be understood to mean software which is either provided in both source code and object code form, or software which is provided as source code from which the object code can be derived.

When used in the claims, "processor" should be understood to mean a device or group of devices which is capable of performing one or more logical and/or physical operations on data to produce a result.

When used in the claims, a "programmer" refers to a person who writes computer programs.

When used in the claims, a "set" should be understood to refer to a number, group, or combination of zero or more things of similar nature, design, or function. When the word "set" is applied to "data" or "information," it should be understood to refer to an identifiable collection of "data" or "information."

We claim:

1. A method of facilitating the creation of, evaluating and responding to requests to use open source software, the method comprising:
  a. allowing a programmer, via a computer input device, to create a request to use open source software in creating code for a product, wherein:
    i. the programmer is assigned to create code for the product; and
    ii. the request is created by entering data into a computer interface specialized for creation of open source requests;
  b. based on the request to use open source software in creating code for the product, storing a set of data in a memory, the set of data comprising:
    i. an indication of the product for which the programmer is assigned to create code; and
    ii. an indication of a license for the open source software requested to be used in creating code for the product;
  c. providing the programmer, via a computer display device, a response to the request to use open source software;
  d. based on the execution by a processor of a set of computer executable instructions stored in a non-transitory computer readable medium:
    i. determining whether a set of effects of granting the request to use open source software in creating code for the product is consistent with a set of commercial objectives for a business, wherein the programmer is assigned to create code for the product on behalf of the business;
    ii. based on the determination of whether the set of effects of granting the request to use open source software in creating code for the product is consistent with the set of commercial objectives for the business, generating the response to the request to use open source software;
  wherein:
  A. determining whether the set of effects of granting the request to use open source software in creating code for the product is consistent with the set of commercial objectives for the business comprises:
    I. determining a set of effects caused by an interaction with open source code indicated in the request to use open source software in creating the product, wherein determining the set of effects caused by the interaction with open source code indicated in the request to use open source software in creating the product comprises retrieving a first multi-valued attribute from a first database table, the values from the first multi-valued attribute representing effects caused by the interaction with open source code indicated in the request to use open source code in creating the product; and II. determining a set of effects caused by an intended use for the code the programmer requested to use open source software in creating, wherein determining the set of effects caused by the intended use for the code the programmer requested to use open source software in creating comprises retrieving a second multi-valued attribute from a second database table, the values from the second multi-valued attribute representing effects caused by the intended use for the code the programmer requested to use open source software in creating;

III. retrieving a third multi-valued attribute from a third database table, the value from the third multi-valued attribute representing the commercial objectives for the business;

IV. combining a plurality of multi-valued attributes comprising:
   the first multi-valued attribute; and
   the second multi-valued attribute; and V. comparing a result of combining the plurality of multi-valued attributes with the third multi-valued attribute.

2. The method of claim 1, wherein:
a. the first multi-valued attribute, the second multi-valued attribute and the third multi-valued attribute are each represented by binary numbers comprising bits;
b. the bits from the binary number representing the first multi-valued attribute represent effects caused by interaction with open source software;
c. the bits from the binary number representing the second multi-valued attribute represent effects caused by use of code;
d. the bits from the binary number representing the commercial objectives for the business represent commercial objectives;
e. combining the plurality of multi-valued attributes comprises ORing binary numbers representing the multi-valued attributes from the plurality of multi-valued attributes; and
f. comparing the result of combining the plurality of multi-valued attributes with the third multi-valued attribute comprises ANDing the binary number representing the third multi-valued attribute and the result of ORing the binary numbers representing the multi-valued attributes from the plurality of multi-valued attributes.

3. The method of claim 1, wherein:
a. the first multi-valued attribute, the second multi-valued attribute and the third multi-valued attribute are each represented by numbers comprising prime factors;
b. the prime factors from the number representing the first multi-valued attribute represent effects caused by interaction with open source software;
c. the prime factors from the number representing the second multi-valued attribute represent effects caused by use of code;
d. the prime factors from the number representing the third multi-valued attribute represent commercial objectives;
e. combining the plurality of multi-attributes comprises multiplying numbers representing the multi-valued attributes from the plurality of multi-valued attributes together; and
f. comparing the result of combining the plurality of multi-valued attributes with the third multi-valued attribute comprises determining if the number representing the third multi-valued attribute and the product of the numbers representing the multi-valued attributes from the plurality of multi-valued attributes have a prime factor greater than one.

4. The method of claim 1, wherein:
a. the memory comprises a non-volatile memory;
b. the set of data comprises:
   i. an indication of an intended use for the code the programmer requested to use open source software in creating;
   ii. an indication of an interaction with open source code indicated in the request to use open source software in creating the product;
c. the computer interface specialized for creation of open source requests comprises tools identified in the computer interface as operable for indicating:
   i. the intended use for the code the programmer requested to use open source software in creating;
   ii. the interaction with open source code;
   iii. the product for which the programmer is assigned to create code; and
   iv. the license for the open source software requested to be used in creating code for the product.

5. The method of claim 4, further comprising storing, in the non-volatile memory:
a. an indication of software integrated in the product for which the programmer is assigned to create code;
b. an indication of a set of licenses associated with the product for which the programmer is assigned to create code;
c. an indication of a set of customers to whom the product for which the programmer is assigned to create code has been provided; and
d. an indication of whether the product for which the programmer is assigned to create code has been screened to identify incoming licenses.

* * * * *